United States Patent [19]

Nicholson

[11] Patent Number: 4,927,103

[45] Date of Patent: May 22, 1990

[54] METHOD AND APPARATUS FOR PIPING SUPPORT

[76] Inventor: Richard J. Nicholson, Rte. 2, Box 137-A, Dothan, Ala. 36301

[21] Appl. No.: 270,072

[22] Filed: Nov. 14, 1988

[51] Int. Cl.$^5$ .............................................. F16L 3/08
[52] U.S. Cl. ...................................... 248/62; 138/106
[58] Field of Search ............... 248/544, 58, 62, 65, 248/71, 74.1, 74.2, 220.2, 223.4, 313, 309.1, 316.1, 316.7, 505; 24/669, 555, 545; 403/397; 285/61, 64; 174/156; 138/106, 107

[56] References Cited

U.S. PATENT DOCUMENTS

| | | | |
|---|---|---|---|
| 3,154,281 | 10/1964 | Frank | 248/71 |
| 3,486,531 | 12/1969 | Nalodka | 138/106 |
| 3,802,655 | 4/1974 | Schuplin | 248/62 |
| 4,260,123 | 4/1981 | Ismert | 248/71 |
| 4,445,255 | 5/1984 | Olejak | 138/106 |
| 4,577,070 | 3/1986 | Shulman | 248/74.1 |
| 4,683,895 | 8/1987 | Pohndorf | 248/505 |
| 4,699,177 | 10/1987 | Thomas | 138/107 |
| 4,714,229 | 12/1987 | Force | 248/74.2 |
| 4,800,926 | 1/1989 | Beck | 138/106 |

FOREIGN PATENT DOCUMENTS 2142376  1/1985  United Kingdom ................ 248/73

Primary Examiner—Ramon O. Ramirez
Assistant Examiner—Robert A. Olson
Attorney, Agent, or Firm—L. F. Hilbers

[57] ABSTRACT

A pipe support system comprises a pipe fitting and a pipe support. The pipe fitting is any standard fitting with the addition of two lugs added to the outside surface of the fitting so that they are diagonally opposite each other. The support has two arms joined together at the base and shaped so that they partially wrap around the fitting after installation. The inside surface of each arms is shaped to have a socket, the walls of which fit snugly against the respective lug after installation. The arms are fabricated of a stiff, elastic material so as to allow sufficient flexation of the arms during the installation of the fitting so that the fitting can pass between the tops ends of the arms without the support becoming permanently distorted.

3 Claims, 4 Drawing Sheets

U.S. Patent   May 22, 1990   Sheet 1 of 4   4,927,103
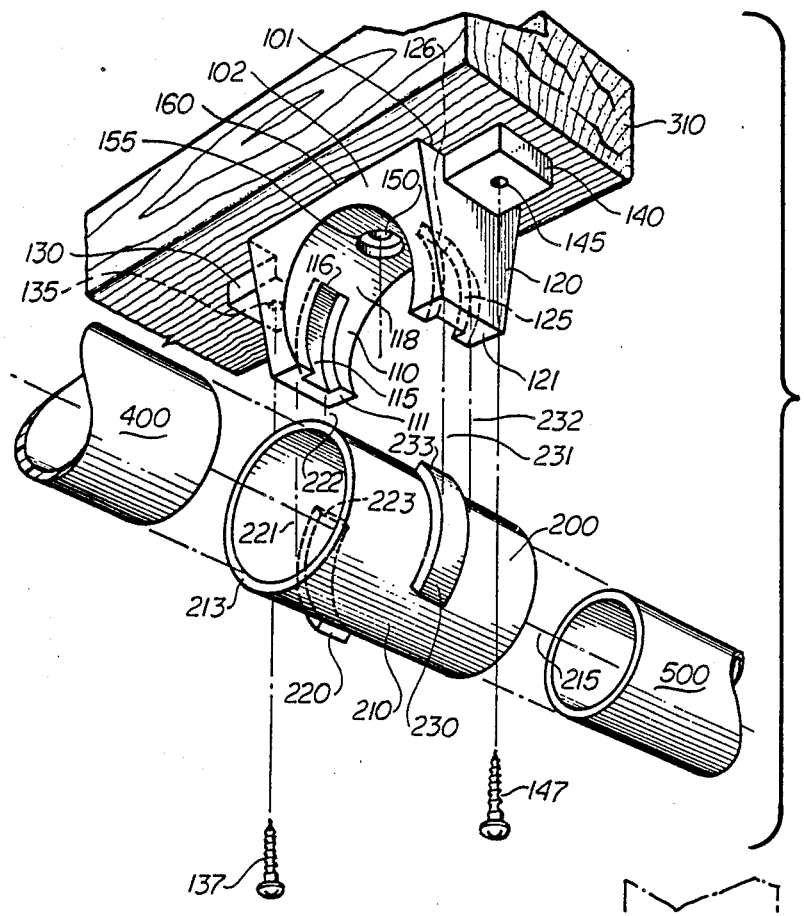
FIG 1
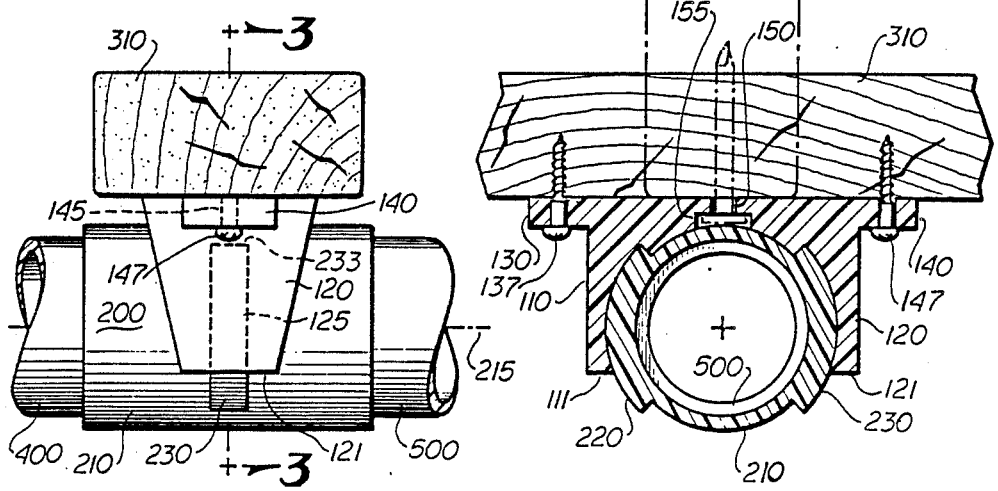
FIG 2   FIG 3

METHOD AND APPARATUS FOR PIPING SUPPORT

BACKGROUND OF THE INVENTION

I. Field of the Invention

The present invention relates to an improved apparatus for attaching, supporting and/or restraining runs or lengths of piping, tubing, or conduit.

II. Prior Art and Other Considerations

Apparatus of various configurations for attaching, supporting or restraining lengths of pipe or tubing are not new, but prior art reveals that existing devices have certain limitations or disadvantages which the present invention effectively overcomes. Within my knowledge of prior art the disclosures of existing devices reveal that they are somewhat restricted in their applications, being limited by size of pipe or tube, strength of structural material, conductivity of the structural material, overall effectiveness, or a combination of one or more of these limitations. Existing devices may also be cumbersome and time consuming to install or they may not be readily adaptable to repositioning of pipe or tubing once the device is installed. Also, existing devices may require that the object of their utility be installed simultaneously with the installation of the support device.

SUMMARY

In view of the foregoing, it is an object of the present invention to provide method and apparatus for effectively supporting pipe, tubing or conduit with a simple, inexpensive, efficient, accommodating, multi-directional support device, which can be installed prior to the object of its utility while requiring only minimal time and effort to install.

It is an advantage of the invention to provide a support device which can effectively reduce thermal and electrical conductivity between the support device and the object of its utility while at the same time providing the strength to support heavy vertical loads.

Another advantage in preferred embodiments of the invention, is that "lugged" support fittings are utilized which virtually eliminate bending of the piping or tubing when stressed by loads due to weight or thermal displacement and it is this embodiment which provides for the multi-directional capability of the present invention.

A pipe support system comprises a pipe support and a complimentary pipe fitting. The pipe fitting is a union fitting, a "T" fitting or an angle fitting which joins two or more runs of piping. It is standard except for the addition of one or more mechanical protrusions.

The pipe support is configured so that upon installation of the fitting, the support cradles more than half of the outer perimeter of a cross section of the fitting. Installation is accomplished by virtue of the fact that the pipe support is fabricated or constructed in a manner whereby it exhibits sufficient elasticity to allow the fitting to pass from an uncradled proximity to a position of being completely and snugly cradled. The support is fabricated with one or more recesses to snugly accommodate the one or more protrusions.

BRIEF DESCRIPTION OF THE DRAWINGS

The foregoing and other objects, features, and advantages of the invention will be apparent from the following more particular description of perferred embodiments as illustrated in the accompanying drawings in which reference characters refer to the same parts throughout the various views. The drawings are not necessarily to scale, emphasis instead being placed upon illustrating the principles of the invention.

FIG. 1 is a isometric view of a pipe support mounted on a wooden structure, shown with an exploded view of a pipe union, lugs attached, about to be fitted into the support.

FIG. 2 is a side view of the support of FIG. 1, but with the union fitted into the support and not exploded.

FIG. 3 is a cross-sectional view, taken on the line 3—3 of FIG. 2.

DETAILED DESCRIPTION OF THE DRAWINGS

Figure 4:
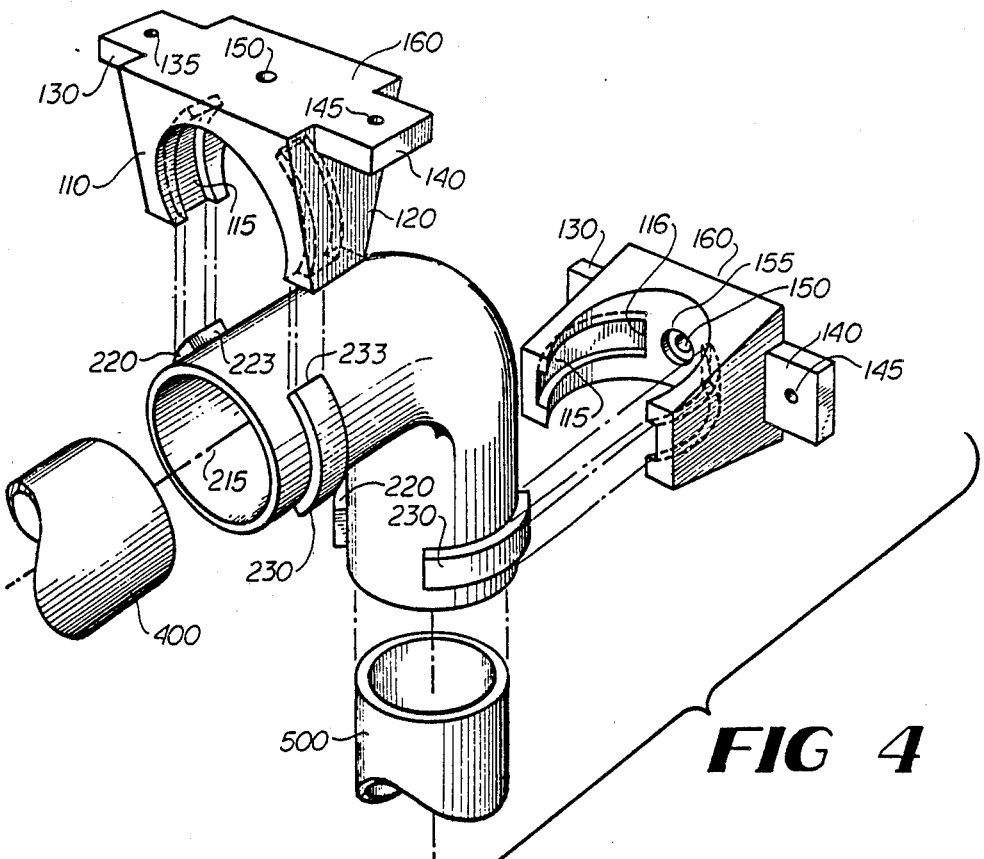
FIG. 4 is an isometric view of two pipe supports showing how they relate to a ninety degree (90°) pipe elbow.

A pipe support system of FIG. 1 comprises a first pipe support 101 and a complimentary pipe fitting 200. The pipe support first 101 comprises a left arm 110, a right arm 120, a left tab 130, and a right tab 140.

The arms 110 and 120 are structurally joined at a base 102. The left arm 110 extends from the base 102 to a left upper end 111; the right arm 120 extends from the base 102 to a right upper end 121. The arms 110 and 120 are shaped so that they are separated by a partially cylindrical area 118 which forms an arc greater than 180° but less than 270° and extending generally from the left upper end 111 to the right upper end 121 and passing near the base 102.

The bases of the arms 110 and 120 are securely joined and jointly form a mounting area 160 for the support 101. This mounting area 160 is shown more distinctly in FIG. 4, FIG. 5 and FIG. 6. Generally in the center of this mounting area 160 which is generally midway in between the arms 110 and 120, there is a guide hole 150. At the end of the guide hole 150 nearest the cylindrical area 118 there is a cylindrical recess 155 formed with respect to the same center line as the guide hole 150. Any standard nail, chosen so as to fit through the guide hole 150, may be used as a mounting guide nail 103 (shown in FIG. 3). The arms 110 and 120 are manufactured of a stiff, elastic material so as to allow sufficient flexation of the arms 110 and 120 during installation of the fitting 200 so that the flexed dimensional separation of the arms 110 and 120 will accommodate the outside diameters of the fitting 200. The arms 110 and 120 spread apart without becoming permanently distorted when the fitting 200 is being inserted into or removed from the first pipe support 101. As installation is completed, the arms 110 and 120 return to generally the same configuration as the pre-flexed configuration. The elasticity of the arms 110 and 120 is chosen so that the force required for removal is greater than the force created in that direction by natural loading of the piping system.

The side of the left arm 110 formed by the cylindrical area 118 is further shaped so as to have a left socket 115. The side of the right arm 120 formed by the cylindrical area 118 is further shaped so as to have a right socket 125. These sockets 115 and 125 will be described in further detail, below.

At opposite sides of the mounting area 160, are a left tab 130 and a right tab 140. Both tabs 130 and 140 are flat. The left tab 130 is rigidly attached to the portion of the base adjacent to it. The right tab 140 is rigidly attached to the portion of the base adjacent to it. The bottom of each tab 130 and 140 is structured so that it becomes a part of the mounting area 160. Near the center of the left tab 130 is a left screw hole 135. Near the center of the right tab 140 is a right screw hole 145. Any standard screw, chosen so as to fit through the left screw hole 135, may be used as a left screw 137. Any standard screw, chosen so as to fit through the right screw hole 145, may be used as a right screw 147.

The pipe fitting 200, shown in FIG. 1 to be a modified union 210, has a left lug 220 and a right lug 230 formed onto the outside of the union 210 and diagonally opposite each other. The left lug 220 is formed to have the shape of an arced segment of a slice of a cylindrical pipe somewhat larger than the union 210, where the slice is taken perpendicular to the center line of the pipe and where the inside diameter of the the slice is equal to the outside diameter of the union 210. The arc is approximately 90°. The right lug 230 is formed to have the shape of an arced segment of a slice of a cylindrical pipe somewhat larger than the union 210, where the slice is taken perpendicular to the center line of the pipe and where the inside diameter of the the slice is equal to the outside diameter of the union 210. The arc is approximately 90°.

The left arm 110 is fabricated so that the left socket 115 has a shape that is complimentary to the left lug 220. The right arm 120 is fabricated so that the right socket 125 has a shape that is complimentary to the right lug 230.

A near segment 400 of pipe fits into the near hole 213 of the union 210. A far segment 500 of pipe fits into the far hole (not shown) of the union 210.

In practice, the mounting area 160 of the pipe support first 101 is placed in a desirable location against a wooden mounting structure 310. In FIG. 1, this location is shown to be a bottom surface of a horizontal wooden mounting structure 310. The nail 103 is placed into the guide hole 150 and driven into the structure 310 until the support first 101 is held firmly in place and the head 104 of the nail 103 is entirely contained within the recess 155.

The support first 101 is then rotated about an axis, passing through the guide hole 150 and perpendicular to the mounting area 160, until the axis of the cylindrical area 118 is parallel to the desired direction of travel of the the pipe to be installed.

The left screw 137 is fitted through the left screw hole 135 and driven into the wooden mounting structure 310 so as to pull the mounting area 160 securely against the wooden mounting structure 310. The right screw 147 is fitted through the right screw hole 145 and driven into the wooden mounting structure 310 so as to pull the mounting area 160 securely against the wooden mounting structure 310.

The modified union 210 is then brought into close proximity with the opening between the arms 110 and 120. It is positioned so that its cylindrical axis of the modified union is parallel to the cylindrical axis to the cylindrical area 118. It is rotated about its cylindrical axis so that the left lug 220 is on the left side and the right lug 230 is on the right side. The modified union 210 is then pressed toward the base of the arms 110 and 120 which is also generally the area of the guide hole 150. This is done in a manner so that the top of the left lug 220 engages the near end of the left socket 115 and simultaneously the upper end of the right lug 230 engages the near end of the right socket 125.

As this movement of closure continues, a point is reached at which the dimension from the outside of the left lug 220 to the outside of the right lug 230 at the top end of the arms 110 and 120 is greater than the dimension between the top end of the left socket 115 and the top end of the right socket 125. A similar dimensional confrontation is reached between the outside diameter of the modified union 210 and the inside diameter of the cylindrical area 118 at the top end of the arms 110 and 120.

As the closure movement continues there is a distortion in the shape of the modified union 210, or the pipe support first 101, or both, so that the closure movement may continue until the modified union 210 comes to rest snugly contained within the cylindrical area 118. Then the left lug 220 is snugly and complimentarily contained by the left socket 115 so that the left lug upper end 223 comes in firm, complimentary contact with the left socket upper end 116, and the right lug 230 is snugly and complimentarily contained by the right socket 125 so that the left lug upper end 233 comes in firm, complimentary contact with the left socket upper end 126.

The arms 110 and 120 now firmly secure the modified union 210 so that it cannot move in any direction perpendicular to the modified union axis 215. Because of the complimentary relationship between the left lug 220 and the left socket 115 and between the right lug 230 and the right socket 125 as set forth in the preceding paragraph, the union 210 cannot move in a direction parallel the the modified union axis 215. Nor can the union 210 rotate about the modified union axis 215, since a clockwise rotational force would merely press the left lug upper end 223 more firmly against the left socket upper end 116, and conversely, a counter-clockwise rotational force would merely press the right lug upper end 233 more firmly against the right socket upper end 126.

Figure 5:
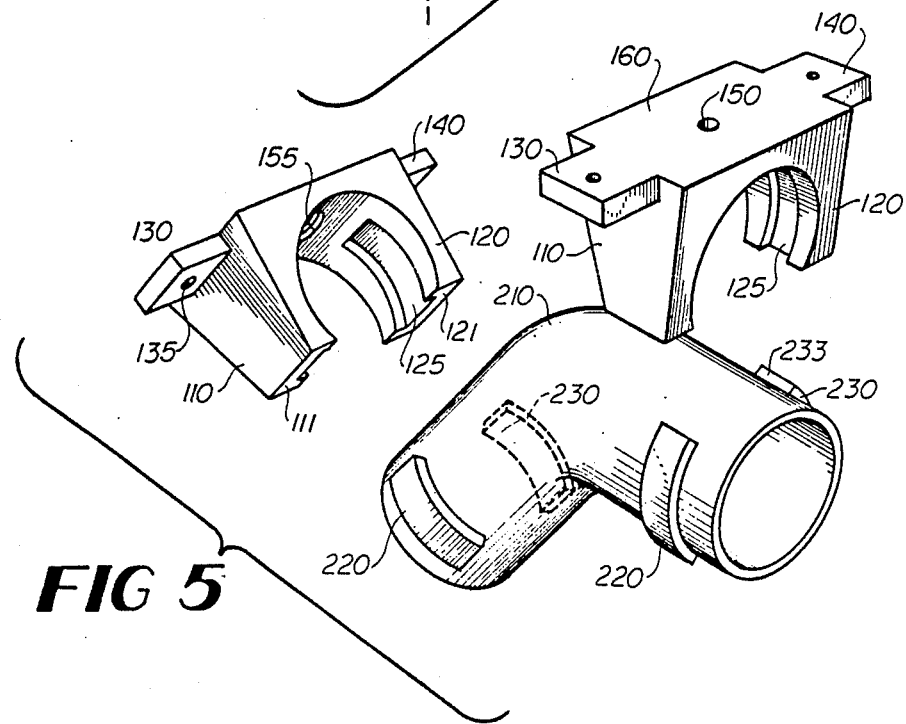
FIG. 5 is an isometric view of two pipe supports showing how they relate to a forty-five degree (45°) pipe elbow.
Figure 6:
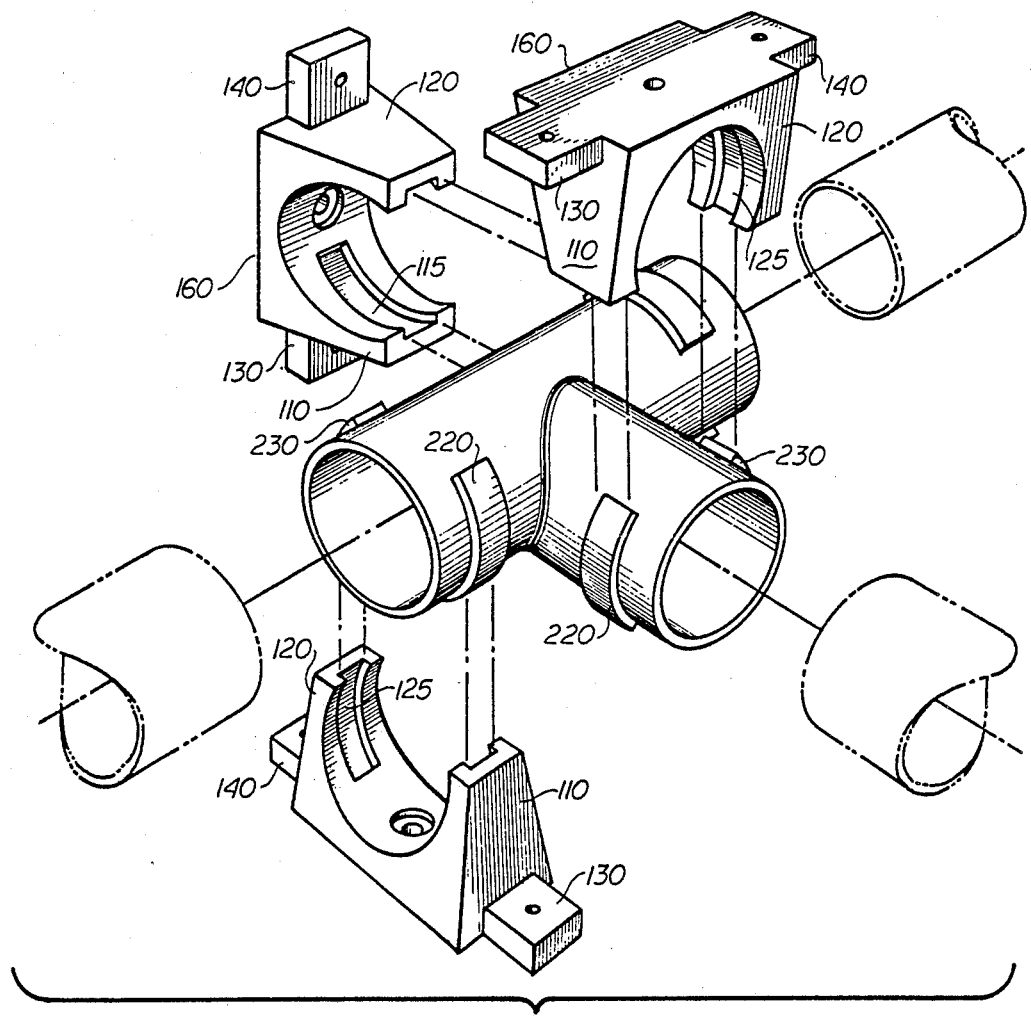
FIG. 6 is an isometric view of three (3) pipe supports showing how they relate to a pipe "T".

Various alternative installation configurations with various alternative pipe fittings are shown in FIGS. 4, 5, 6.

Figure 7:
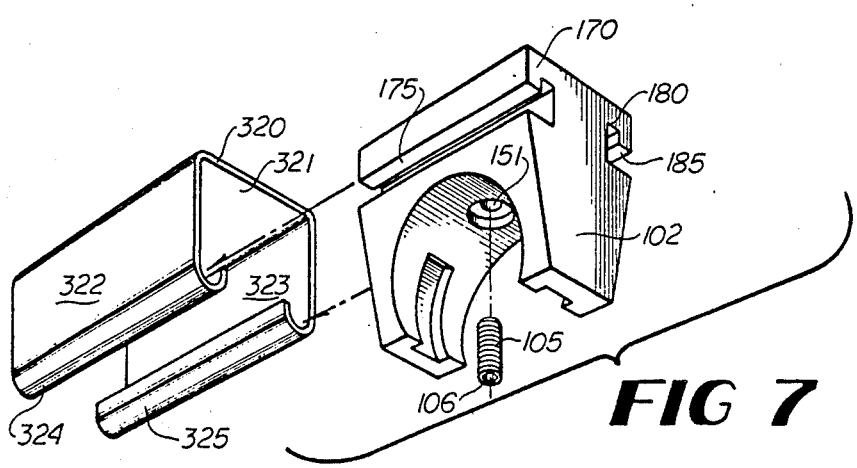
FIG. 7 is an isometric view of a pipe support showing a preferred embodiment designed so as to be mounted in concert with a metal channel.
Figure 8:
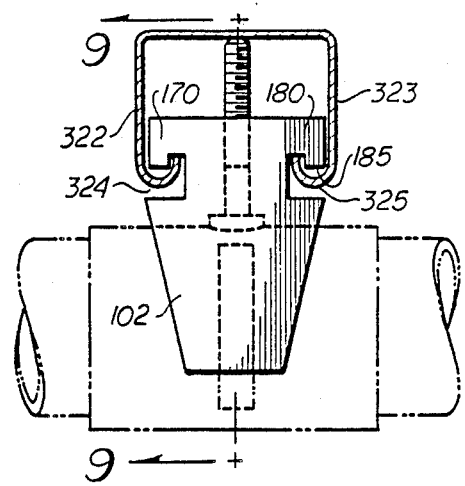
FIG. 8 is a side view of the support of FIG. 7.
Figure 9:
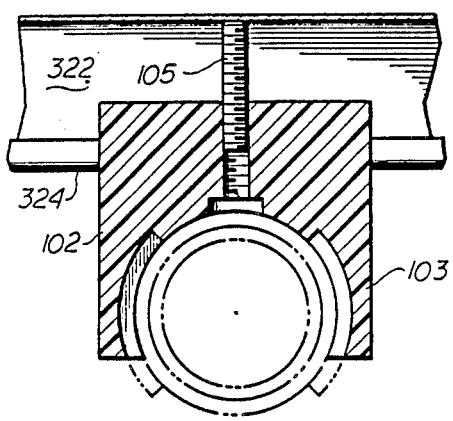
FIG. 9 is a cross-sectional view, taken on the line 9—9 of FIG. 8.

A second preferred embodiment of the pipe support system of FIGS. 7, 8, and 9 shows a second pipe support 102 which comprises a left arm 110, a right arm 120, a near tab 170 and a far tab 180. The structure and function of the arms 110 and 120 in this embodiment are identical to the structure and function described in the first preferred embodiment. In this embodiment, there is a threaded guide hole 151 and a complimentary bolt 105 with an Allen-head socket 106.

Both tabs 170 and 180 are rigidly attached to the base of the arms 110 and 120. The near tab 170, instead of being flat, has an upwardly turned edge 175 along the outside edge of the near tab 170. The far tab 180, instead of being flat, has an upwardly turned edge 185 along the outside edge of the far tab 180.

As associated section of channel 320 is "U" shaped, having a base face 321, a near face 322 and a far face 323. The bottom edge 324 of the near face 322 is formed into a smaller "u" shape by being curved toward the inside of the "U" shape of the channel 320. The bottom edge 325 of the far face 323 is formed into a smaller "u" shape by being curved toward the inside of the "U" shape of the channel 320. Thus the bottom edges 324 and 325 of the channel 320 are formed to have complimentary shapes with that of the tabs 170 and 180 of the second support 102.

The bolt 105 with the Allen-head socket 106 fits against the sides of the threaded guide hole 151 and is driven into the guide hole 151 until it presses against the inside of the base face 321 of the channel 320.

In practice, the section 320 is attached to a desirable structural member at a desirable location using conventional techniques so as to allow the second support 102, now in an inverted position, to be placed in contact with the section 320 so that the near tab 170 rests on the inside surface of the near face "u" shape 324 and so that the far tab 180 rests on the inside surface of the far face "u" shape 325. The second support 102 is slid with the tabs 170 and 180 so contained by the section 320 to a desirable location. The bolt 106 is tightened so that it presses against the inside surface of the base face 321. This in turn presses the tops of the near and far tabs upwardly turned edges 175 and 185 against the inside surface of the near and far smaller "u" shapes which immobilizes the second support 102 at this location.

The second support 102 is now ready to receive an appropriate pipe fitting 200 as described above.

Figure 10:
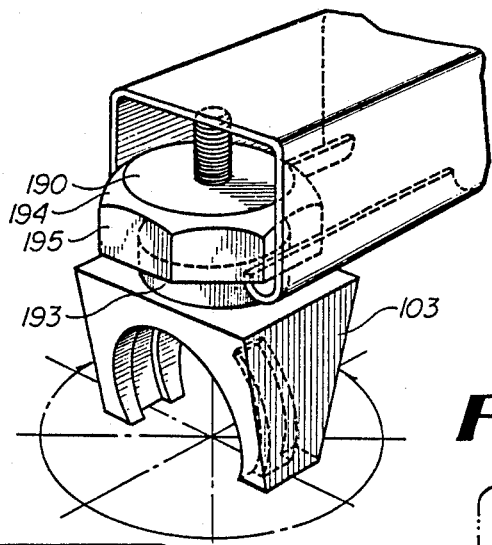
FIG. 10 is an isometric view of a support showing a preferred embodiment designed so as to mounted in concert with a metal channel at any forty-five degree (45°) angular displacement with respect thereto.
Figure 11:
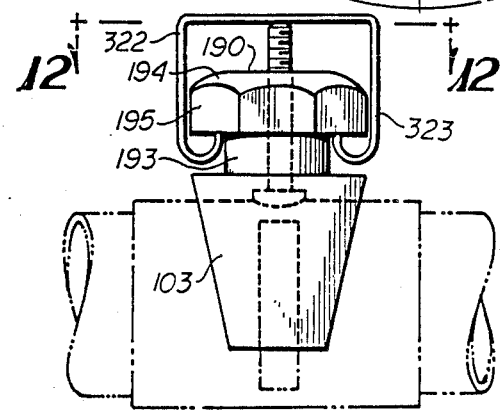
FIG. 11 is a side view of the support of FIG. 11.
Figure 12:
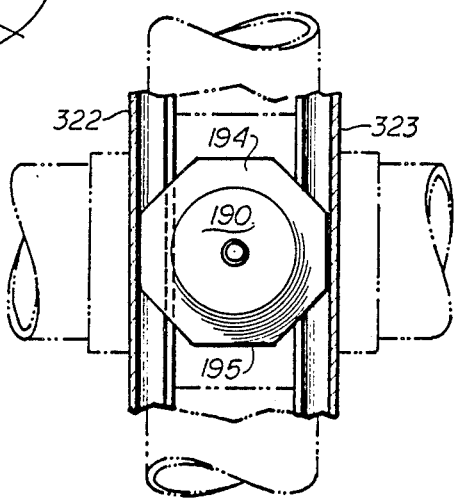
FIG. 12 is a cross-sectional view, taken on the line 12—12 of FIG. 11.

A third preferred embodiment of a pipe support system is shown in FIGS. 10, 11, and 12. A third pipe support 103 as shown in FIG. 10 comprises a left arm 110, a right arm 120, and a mounting knob 190. The structure and function of the arms 110 and 120 in this embodiment are identical to the structure and function described in the first preferred embodiment.

The mounting knob 190 comprises a neck 193 and a head 194. The neck 193 is cylindrical and is rigidly attached to the base of the arms 110 and 120 at one end of the cylindrical shape of the neck 193. The head 194 is rigidly attached to the neck 193 at the other end of the cylindrical shape of the neck 193.

The head 194 has a shape similar to the head of a conventional bolt having eight (8) facets 195. The distance between opposing facets is slightly less that the inside dimension between the near face 322 and the far face 323 of the channel 320. When two facets 195 of the the head 194 are parallel the the near face 322 and the far face 323 of the channel 320, the head 194 will fit inside the channel.

Again, a bolt 105 with an Allen-head socket 106 fits against the sides of the threaded guide hole 151 and is screwed into the guide hole 151 until it presses against the inside face of the base face 321 of the channel 320.

In practice, the installation of the third pipe support 103 is similar the that of the second pipe support 102. The primary difference is that the third pipe support 103 may be installed so that the angular displacement between the pipe fitting axis and the section longitudinal axis may vary from the perpendicular configuration of FIG. 7 in increments of forty five degrees (45°).

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. An apparatus for supporting pipe such as PCV pipe or metal pipe, said apparatus comprising:
    a standard pipe fitting
        having an outer perimeter of its cross section and
        configured with the addition of one or more mechanical protrusions wherein said protrusions are formed to have a shape of an arced segment of a slice of a cylindrical pipe somewhat larger than the fitting so that the outside diameter is the same as the inside diameter of the slice, the slice being taken perpendicular to the centerline of the larger cylindrical pipe and the inside diameter of the slice being equal to the outside diameter of the fitting and
    a pipe support comprising
        one or more arms,
            each having an inner surface, and
            each extending from a common base in a manner whereby the inner surface or surfaces of the arm or arms generally describe an area having a shape complimentary to said outer perimeter,
        a gap between the end of the arm and the base or between the ends of the arms,
        means for temporarily enlarging the gap in a manner whereby the gap is large enough for said pipe fitting to pass through the gap during installation,
        means for reducing the enlarged gap, after installation, in a manner whereby said arm or arms fit snugly around said fitting in a manner whereby said fitting is held securely in place during use,
        means for enlarging the gap, after installation, in a manner whereby the installed fitting may be removed from said support if said removal is intended, and
        one or more recesses of sufficient number shape and position to snugly accommodate said protrusion or protrusions each said recess including an edge which engages an edge of its respective protrusion.

2. The apparatus of claim 1,
    wherein said fitting is a standard round PCV pipe fitting;
    wherein said protrusions are two in number and formed onto the outside of the fitting diagonally opposite each other, each formed to have a shape of an arced segment of a slice of a cylindrical pipe somewhat larger than the fitting so that the outside diameter is the same as the inside diameter of the slice, the slice being taken perpendicular to the center line of the larger cylindrical pipe and the inside diameter of the slice being equal to the outside diameter of the fitting;
    wherein the arms are two in number and said arms extend in opposition to each other from the base and are shaped so that the inside surface of one arm is separated from the inside surface of the other arm by a cylindrical area which forms an arc greater than 180° but less than 270°, which area is complimentary in shape to the outside surface of the fitting in a manner whereby, after installation, said fitting is held snugly by said support;

wherein the arms are fabricated of a stiff, elastic material so as to allow sufficient flexation of the arms during installation of the fitting so that the flexed dimensional separation of the arms will accommodate the outside diameter of the fitting without the support becoming permanently distorted;

wherein the elasticity of the arms is choosen so that the force required for removal of the installed fitting from the support is greater than the force created in that direction by the natural loading of the piping system at the pipe support; and wherein the inner surface of each arm is further shaped to have a recess which is complimentary in shape to the slice in a manner whereby each slice fits snugly into a recess.

3. A method of supporting pipe such as PCV pipe or metal pipe, said method comprising the steps of:

mounting a pipe support in a desired location,
said pipe support being configured to accept, conform with and secure a pipe fitting,
said fitting comprising
a standard pipe fitting,
an outer perimeter of its cross-section, and
the addition of one or more mechanical protrusions wherein said protrusions are formed to have a shape of an arced segment of a slice of a cylindrical pipe somewhat larger than the fitting so that the outside diameter is the same as the inside diameter of the slice, the slice being taken perpendicular to the centerline of the larger cylindrical pipe and the inside diameter of the slice being equal to the outside diameter of the fitting, said support comprising
one or more arms,
each having an inner surface, and
each extending from a common base in a manner whereby the inner surface or surfaces of the arm or arms generally describe an area having a shape complimentary to said outer perimeter, a gap between the end of the arm and the base or between the ends of the arms, means for temporarily enlarging the gap in a manner whereby the gap is large enough for said pipe fitting to pass through the gap during installation, means for reducing the enlarged gap, after installation, in a manner whereby said arm or arms fit snugly around said fitting in a manner whereby said fitting is held securely in place during use, means for enlarging the gap, after installation, in a manner whereby the installed fitting may be removed from said support, and one or more recesses of sufficient number shape and position to snugly accommodate said protrusion or protrusions each said recess including an edge which engages an edge of its respective protrusion, and installing said fitting into said support.

* * * * *